US006847922B1

(12) United States Patent
Wampler, II (10) Patent No.: US 6,847,922 B1
(45) Date of Patent: Jan. 25, 2005

(54) METHOD FOR COMPUTER-AIDED LAYOUT OF MANUFACTURING CELLS

(75) Inventor: Charles W. Wampler, II, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/478,731

(22) Filed: Jan. 6, 2000

(51) Int. Cl.[7] ............................................. G06F 17/50
(52) U.S. Cl. ...................... 703/1; 703/6; 703/7; 703/8; 700/56; 700/96; 700/251
(58) Field of Search ............................. 703/1, 7, 8, 6; 700/56, 96, 251

(56) References Cited

U.S. PATENT DOCUMENTS

| | | | | |
|---|---|---|---|---|
| 5,357,439 A | * | 10/1994 | Matsuzaki et al. | 700/96 |
| 5,745,735 A | * | 4/1998 | Cohn et al. | 703/6 |
| 5,949,693 A | * | 9/1999 | Tandler | 703/1 |
| 6,004,016 A | * | 12/1999 | Spector | 700/56 |
| 6,292,715 B1 | * | 9/2001 | Rongo | 700/249 |
| 6,470,301 B1 | * | 10/2002 | Barral | 703/1 |

OTHER PUBLICATIONS

Lueth, "Automated Planning of Robot Workcell Layouts", Proceedings of the 1992 IEEE International Conference on Robotics Automation, May 1992, pp. 1103–1108.*

* cited by examiner

Primary Examiner—Jean R. Homere
Assistant Examiner—Herng-der Day
(74) Attorney, Agent, or Firm—Kathryn A. Marra (57) ABSTRACT

A computer assisted method is disclosed for making an optimized layout of a manufacturing cell to be used, for example, to locate, hold and process workpieces, such as in robotic welding of an assembly of stamped sheet metal parts. The items to be processed and employed in the cell are identified by physical structure and kinematic characteristics and given an initial location to start the process. Further movements of the parts toward attraction points and away from repelling points are evaluated on the computer by an optimization program to arrive at an optimized cell layout.

9 Claims, 7 Drawing Sheets

METHOD FOR COMPUTER-AIDED LAYOUT OF MANUFACTURING CELLS

TECHNICAL FIELD

This invention pertains to processes for computer-aided layout of workpiece holding and joining operations in the assembly of manufactured parts.

BACKGROUND OF THE INVENTION

A manufacturing cell for automotive body assembly has multiple devices that work in close proximity. Stamped sheet metal parts, or the like, are loaded into a fixture consisting of many locating pins and clamps. The clamps close to hold the parts immobile and in proper alignment and then machinery to join the parts moves to engage them. The most common joining technique is resistance spot welding in which a welding gun is moved from welding location to location, manually or robotically. Similar workpiece holding and joining operations are performed in the manufacture of many products.

A new development in such manufacturing operations is the availability of programmable fixtures for parts to be joined. Fixturing elements are carried by programmable robotic devices and can thus be repositioned for production of several different assemblies in the same manufacturing space or cell. In a more conventional cell, the fixtures may either be fixed or may slide or rotate into place, driven by air cylinders.

The design or manufacturing layout of such cells requires elimination of interference between the parts and the various manufacturing devices and the avoidance of any collisions as the devices move. The layout task becomes more difficult as more moving devices operate in the same work volume and as the cell is designed to produce more than one specific assembly, as is the case for programmable fixtures.

In order to best utilize programmable fixtures, it is desirable and necessary to have a computer-aided method for designing such a manufacturing cell so that proper operation of the cell can be verified in simulation before construction of the actual equipment proceeds. In addition, the motions planned in simulation can be stored and used when the applicable part is being produced.

SUMMARY OF THE INVENTION

The invention is a method to be executed on a computer for designing a manufacturing cell such that a desired sequence of operations involving one or more moving robots or other programmable machines can be carried out without interference between any of the moving or fixed machine items in the cell. The method determines the placement of each machine or end-effector in the cell and determines the joint displacements required for each operation in the sequence. The resulting layout is such that there are no collisions at the time of each step in the sequence of operations. However, creation of collision-free motions between these steps is a secondary problem, outside the scope of this invention.

Each robot, end-effector or other tool or machine is identified in the database of the computer. (Any of these may be called generically "devices" in this specification.) In accordance with a preferred embodiment of the invention, a scaled representation of each relevant machine item is formed on the computer screen and located on a suitable grid representation of the manufacturing cell area. Each device consists of one or more rigid elements (sometimes called "links" in this specification) connected by joints. The geometric shape of each link is identified in the database as well as the relevant kinematic properties of the joints between them. Suitable "frames" or coordinate systems are applied to each such link and serve as the basis for optimized location of the devices in the cell. Frames that are to merge or coincide are identified in the database as "attracting pairs", and links that are not to contact or interfere are identified as "repelling pairs".

The devices are given initial locations by the cell layout designer to provide a stating point for the process. A planned sequence of provisional movements of the devices is then specified, including the configurations of the devices at the completion of each of movement. The movements are tried and tested and evaluated according to an objective function that grows large for large distances in attracting pairs, for small separation distances in repelling pairs, and for small margins in joint limits. A suitable known optimization software program adjusts the locations and movements of the devices to minimize this objective function. After the movements of the devices have been thus optimized, the designer can assess the result. If deemed appropriate, the designer can make modifications in a variety of ways, for example, changing the sequence of operations or changing the devices used.

The complete layout of a manufacturing cell may be accomplished in a single sequence of process steps, or it may evolve through two or more stages if the complexity of the cell layout requires it. For example, if the cell will include both workpiece fixturing machines and processing machines, such as welding robots and welding guns, it may be preferable to obtain provisional positions for the fixtures in a first stage and locate the welding guns and robots in subsequent stages.

Other objects and advantages of the subject manufacturing cell layout will become more apparent from a detailed description of a preferred embodiment, which follows. In that description, reference will be made to drawing figures that are described in the next section of this specification.

DESCRIPTION OF A PREFERRED EMBODIMENT

The practice of the process of this invention will be illustrated in the locating of two sheet metal stampings that are to be precisely superimposed and welded in a manufacturing cell dedicated to welding different but structurally similar parts. For simplicity and clarity of illustration and description, the process will be described in joining two tail panel pieces for a single model of automobile. However, it is to be understood that, in many situations, the subject process would be used to layout the necessary equipment in a manufacturing cell for positioning and welding tail panel assemblies, or the like, for several different vehicles.

Description of Workpieces and Tools for the Manufacturing Cell

Figure 1:
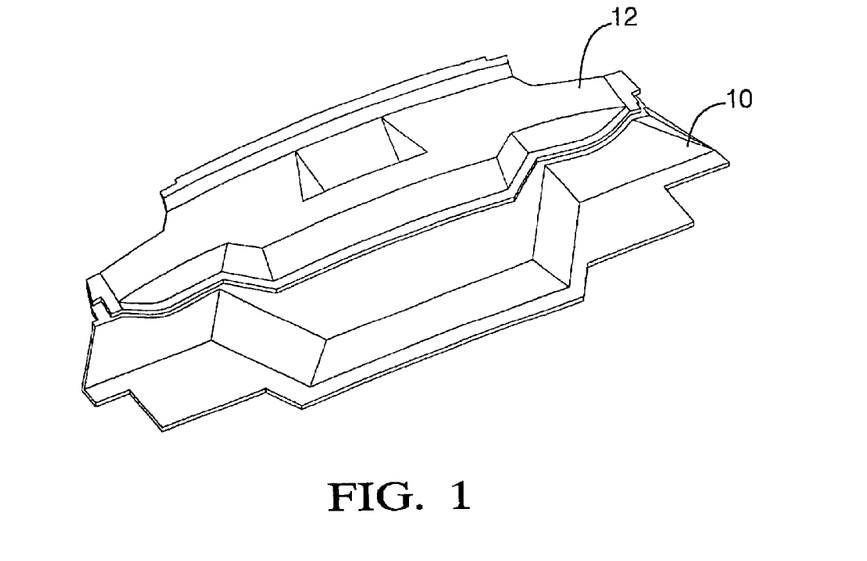
FIG. 1 is a perspective view of two superimposed, stamped sheet metal parts to be located and welded in a manufacturing cell in accordance with the computer-aided cell layout method of this invention. The stampings used for illustration are inner and outer tail panel parts for an automobile.

FIG. 1 shows inner 10 and outer 12 tail panel stampings. The stampings are typically stamped and trimmed from a sheet of suitable steel or aluminum alloy. The inner and outer panels would then be juxtaposed as shown in FIG. 1 and welded together to form a tail panel assembly. Later, this assembly would be arranged in a suitable body fixture with complementary side panels, underbody panels, and the like, and welded into a body structure for an automobile. The purpose of this illustration is to show how the subject process, carried out on a suitably programmed computer, can provide a layout of equipment in an automated manufacturing cell to locate, fix and weld two tail panel stampings.

Figure 2:
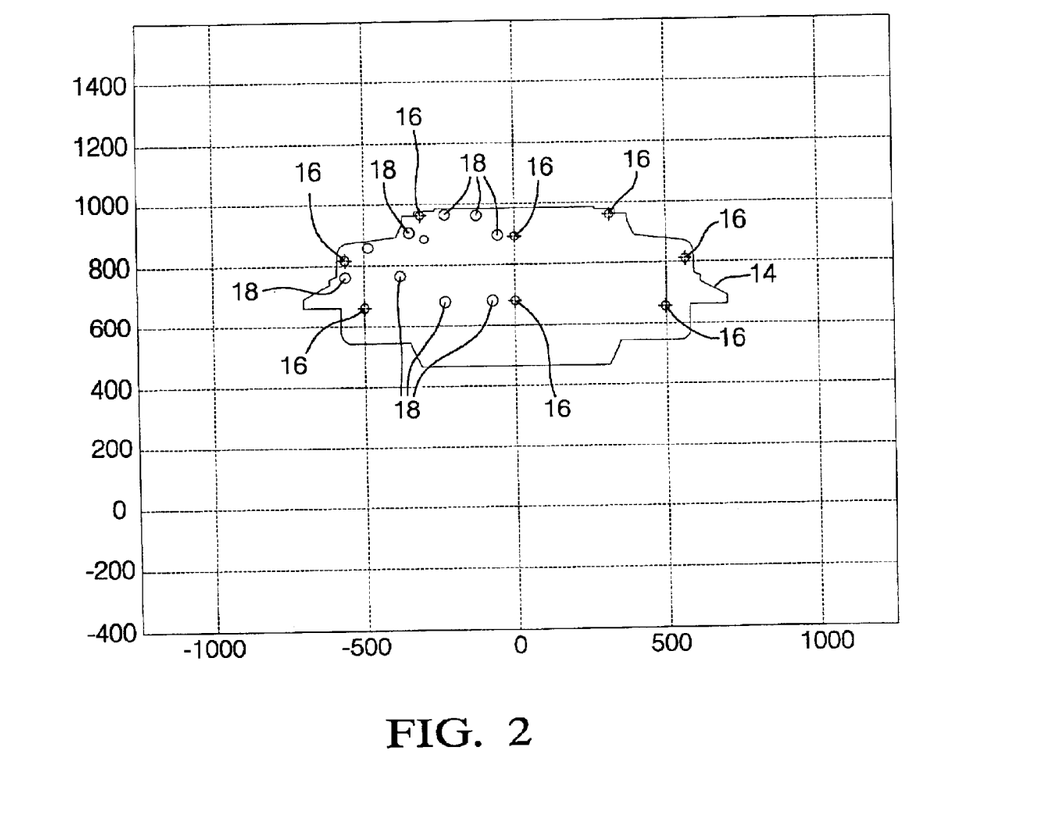
FIG. 2 is a plan view of the overlaid parts on a coordinate grid such as would be depicted on the computer screen of a user of the subject process. Fixture locating points and some weld points are shown in the view.

FIG. 2 shows a computer-generated two-dimensional grid with an accurately scaled silhouette of the assembly 14 of the inner 10 and outer 12 tail panel stampings. Included on assembly silhouette 14 are eight locating points 16 and nine spot welding locations 18. Locating points 16 are the locations where the process designer intends that clamping tools grip and locate the two-piece assembly for welding. Precise location of the assembly is critical because the welding robot is to be numerically controlled and will be directed by its control module to specific locations. Moreover, the relative location of the inner and outer stampings must be precise so that the shape of the assembled tail panel is correct. Welding locations 18 are, of course, where spot welds are to be made after the assembly is properly located in the cell. In order to reduce clutter in the FIG. 2 and subsequent drawings, only the weld locations on the left side of assembly 14 are shown. But there would be an equal number of symmetrically located weld locations on the right side of the assembly. Locating points 16 and welding locations 18 are also the origin points of "frames" as defined below.

Figure 3:
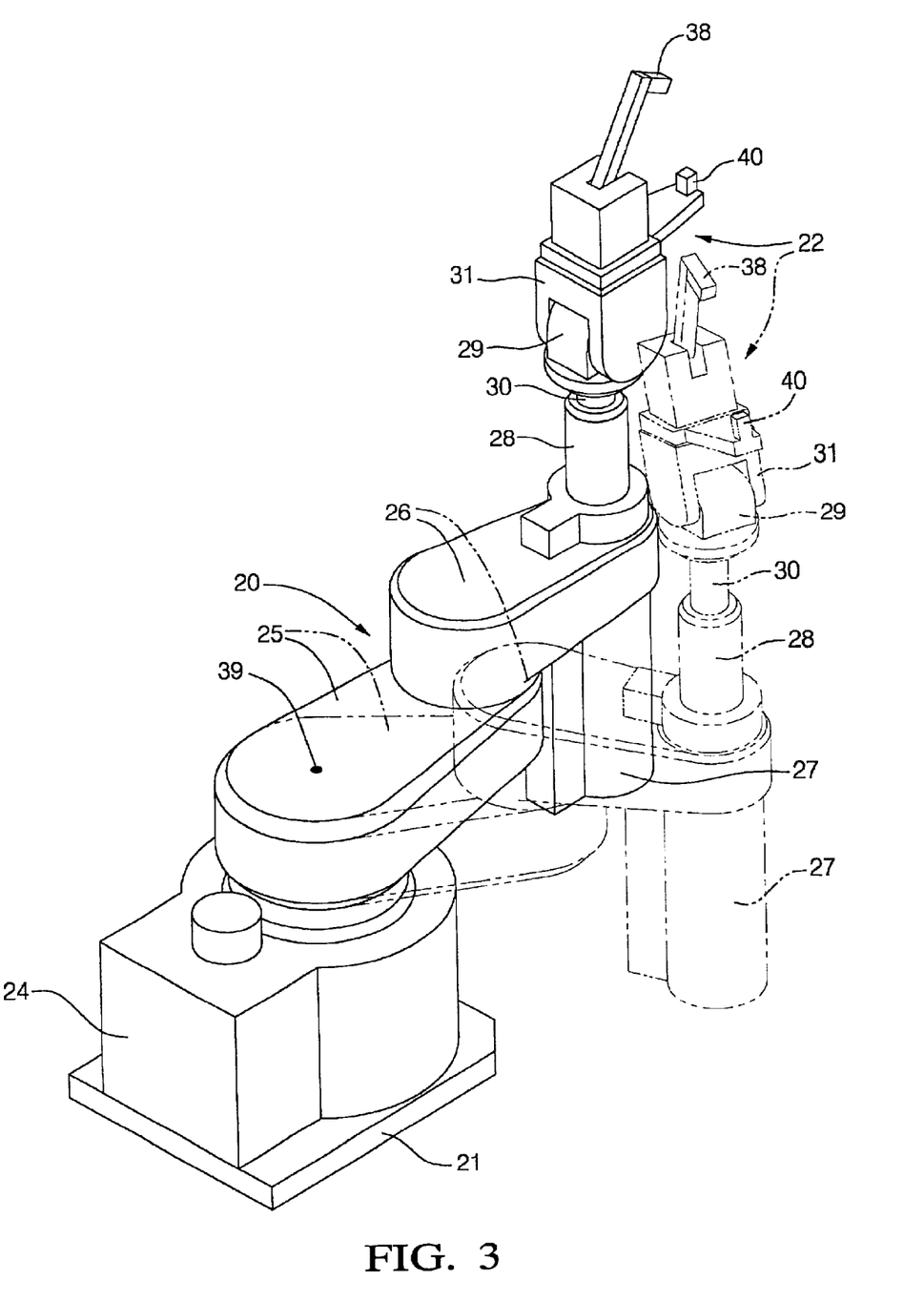
FIG. 3 is a perspective view illustrating two positions of a movable, programmable workpiece locating device carrying an end-effector that is a clamping tool.

FIG. 3 illustrates a movable and programmable locating fixture apparatus 20 adapted to carry a clamping tool end-effector 22. Such fixture apparatus are commercially available. Locating fixture apparatus 20 has a base member 24 for carrying swivel supports 25 and 26. Base member 24 is carried on a bolt plate 21 for location in a manufacturing cell. Base member 24 contains an electric motor and gearing (neither shown) for operation of the locating fixture 20.

Swivel support 26 carries an elevator member 27 with vertically actuatable elevator shaft 28 and wrist shaft 30. Wrist shaft 30, in turn, carries a two-piece wrist mechanism (29, 31) in which holder member 29 rotates around the vertical elevator shaft 28. Holder 29 carries a semi-cylindrical yoke 31 that rotates around a horizontal shaft within holder 29. The two swivel axes, the elevator axis, and the two rotational axes of the wrist 29, 31 are driven by electrical servo motors which can be computer-controlled to place an end-effector in any required position and attitude within a certain working volume. In this illustration, the end-effector is a clamping tool 22, having clamping jaws 38 (upper) and 40 (lower), driven by air cylinder and internal linkages (not shown).

The center of rotation 39 of swivel support 25 is taken as the locating point for locating fixture 20.

Figure 4:
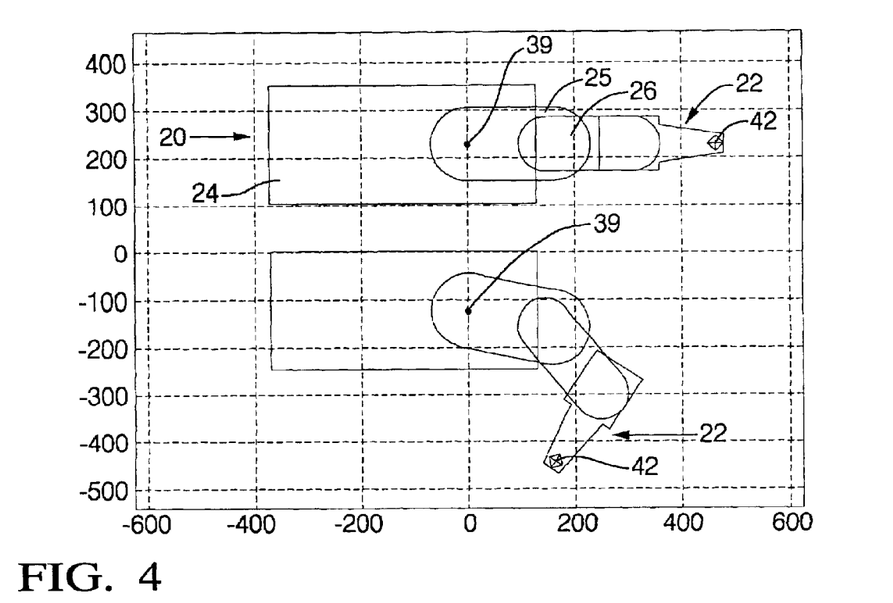
FIG. 4 is a computer-generated, plan view with coordinate grid of the locating device shown in FIG. 3. The device is shown in two positions.

FIG. 4 shows a computer-generated plan view of the locating device 20 with base member 24, swivel supports 25 and 26 and clamping tool 22 shown in plan view. Two views of the same device 20 in different positions are shown in FIG. 4. The diamond symbols 42 on the clamping tools 22 show the bite of the jaws which are the locating points to be matched with locations on tail panel assembly 14. The diamond symbols 42 are the origin points of "frames." as defined below.

The other tool that is to be used in the manufacturing cell is a welding robot and attached spot welding gun. These tools are in very widespread use in industry. FIGS. 7–11 show computer-generated plan views of a welding robot 44 and its spot welding gun 46. Robot arm 45 carries a single welding gun 46 with welding site 48, but the gun is shown unattached and in several different sequential positions in the drawing figures.

Description of Computer-Aided Manufacturing Cell Layout Process

Definitions

In the following description of the steps for setting up a computer-aided manufacturing cell optimization, the following terms have the following meanings.

Device

A device is one or more rigid bodies connected by kinematic joints (rotational, translational, spherical or fixed). The rigid bodies are also called links.

The connection pattern can be a single serial chain, a tree structure, or a general structure with closed mechanical loops. Locating fixture apparatus 20, thus, is a device consisting of six links: the base 24, swivels 25 and 26, elevator shaft 28, vertical wrist shaft 30, holder 29 and yoke 31. Similarly, clamping tool 22 is a device consisting of 2 links, which are the upper 38 and lower jaws 40. The values of all joints are functions of the device degrees of freedom (d.o.f.). A device can be a single rigid body (no joints), a locating fixture (conventional or programmable), a robot, or an end-effector (such as a clamping tool or weld gun).

A device definition includes limits on joint motions.

Frame

A frame is a coordinate system embedded in a link. A frame is specified by a general three-dimensional translation and rotation with respect to the coordinate system of the link. A frame moves with the link in which it is embedded.

Attachment

An attachment is the relative location of a device. Every device has a base link which must either be attached to ground or attached to a link of another device. The attachment is given as a general three-dimensional translation and rotation of the base with respect to the coordinate system of the link to which it is attached.

Program Sequence

The program sequence is a tree structure, each of whose nodes is a step of the sequence. The tree has the following characteristics. The root node represents the initial configuration of the work cell. Every node contains a fist of the devices that move at that step and a set of values for the device degrees of freedom. These values describe the final configuration of the device after the step has been executed. Any device not listed in a step is stationary. Its degree-of-freedom values are thus inherited from the parent step.

Leaf nodes of the tree may have a pointer to a non-leaf node, indicating a loop in the program sequence. A node with more than one child indicates a branch point where a choice of alternative next steps is possible.

Figure 12:
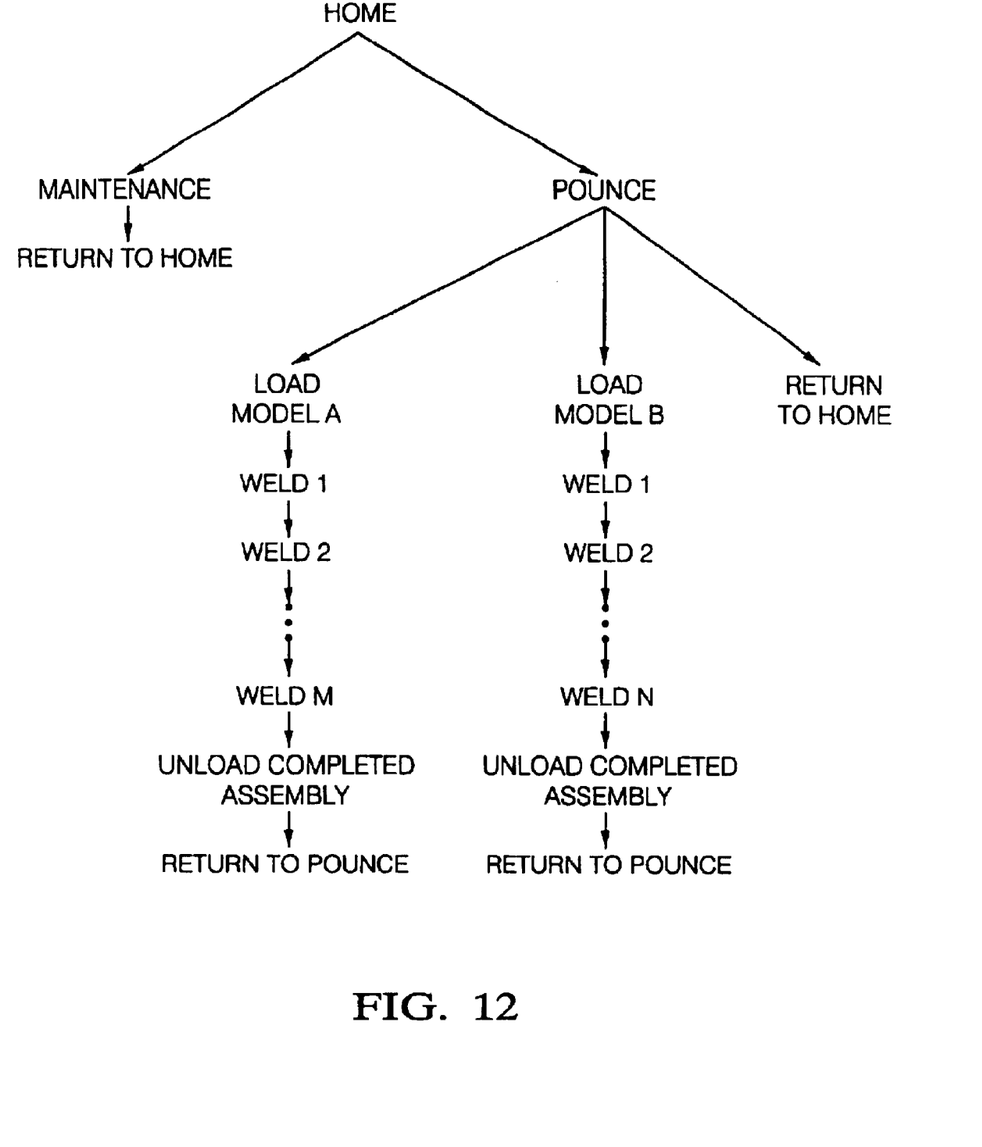
FIG. 12 is a depiction in the form of a tree structure of a sequence of program steps for a manufacturing cell.

FIG. 12 is an example of a depiction in the form of a tree structure programming sequence of a manufacturing cell. This drawing figure is described in more detail below.

Attracting Pair

Figure 5:
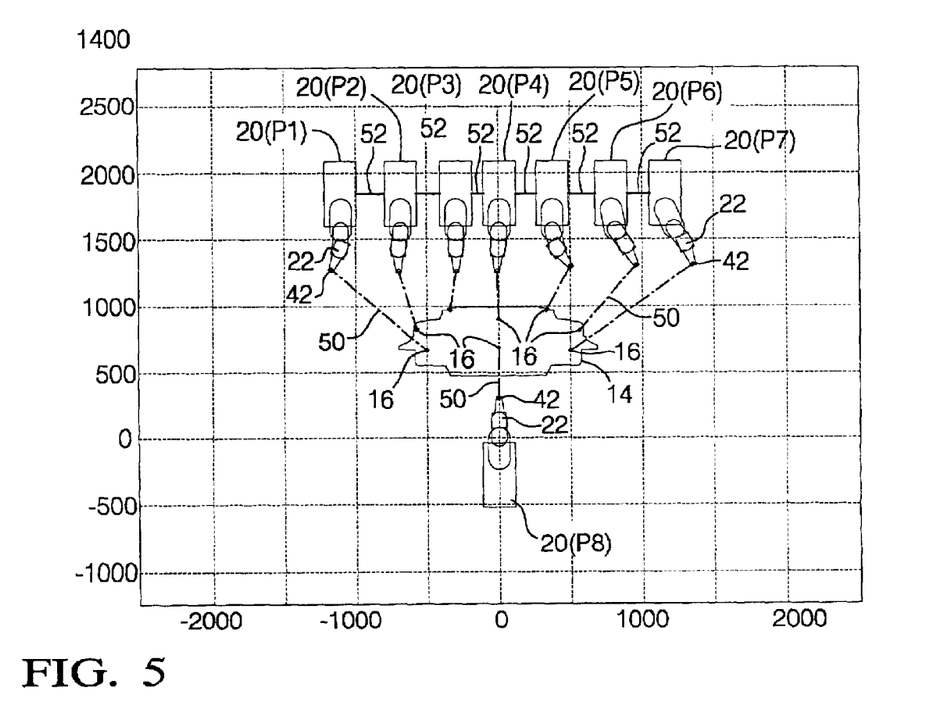
FIG. 5 is a computer-generated, plan view with coordinate grid of an initial arrangement of eight locating devices around superimposed tail panel parts.

The concept of "attracting pair" is a means in this computer-aided process of capturing the user's intention that two frames should coincide. An attracting pair includes a pair of frames such as the bite tip or frame 42 of each clamping tool 22 and clamping locations 16 in tail panel assembly 14. FIG. 5 shows eight attracting pairs 50 connecting frames 42 on respective clamping tools 22 and clamping locations 16. Each frame belongs to a specified link of a specified device at a specified step. An attracting pair also includes a type, which is one of the following:

Point-to-point attraction of the frames' origin points. This leaves the relative rotation of the frames free.

Point-to-point attraction of origins plus alignment of one direction. This leaves only rotation about the specified direction free.

Point-to-point attraction of origins plus full rotational alignment of the frames.

In two-dimensional models, the first two of these types are equivalent because the implied third dimension is perpendicular to the modeling plane and is therefore always aligned for all frames. Since the cases illustrated herein entail only point-to-point attractors, only the origin points of the frames have been shown for clarity.

Repelling Pair

The notion of a "repelling pair" is a means of capturing the user's intention that two links cannot occupy the same volume of space at the same time. See the six repelling pairs 52 between adjacent locating fixtures 20 in FIG. 5. A repelling pair consists of a pair of distinct links and (optionally) a specified step. The pair can also be given a clearance distance, which is by default equal to zero. At least one of the links must be moving at the specified step. It is not necessary for both links to be moving at the specified step. A repelling pair between devices can be interpreted as a complete bipartite graph of repelling pairs between their links. If a step is not specified, the pair is invoked at every step in which at least one of the links moves.

The pair of links is considered free of mutual interference only if their separation distance is greater than the specified clearance distance.

Potential Function

The potential function is the sum of the contributions from attracting pairs, repelling pairs and joint limits:

$$P = \Sigma_i P_A(d_i) + \Sigma_j P_R(d_j) + \Sigma_k P_L(\delta_k)$$

where i ranges over all attracting point pairs, j ranges over all repelling part pairs, and k ranges over all joint limits. The functional form of each of these components is given in the following paragraphs. Note that for every step in which a device moves, there are new contributions to the repelling component and the joint limit component and often a new attracting pair as well. One sums over all of these, so the definition of P spans the whole program flow of the workcell, not just one instant of time.

Each attracting pair contributes a potential value that grows monotonically with increasing distance between the pair and is zero when the pair coincides. As described above, an attracting pair between frames comprises one, two or more pairs of attracting points. Let d be the distance between one such pair of points. Then, the pair contributes a component $P_A(d)$ to the potential. Two forms of the attracting potential have been used: a quadratic form, $P_A(d)=\alpha^2 d^2$, and a blended form, as follows.

$$P_A(d) = \begin{cases} \alpha^2 d^2, & \text{if } d \le d_0; \\ \alpha^2(2d_0 d - d_0^2), & \text{if } d > d_0. \end{cases}$$

In these formulas, a is a scale factor. The blended form is preferred, as it provides a smooth quadratic basin near the optimum yet avoids the extremely large values that would be induced by the pure quadratic form when d is large. It is found that when d is measured in meters, the values $d_0=0.001$, $\alpha=1000$ perform well, placing the transition between quadratic and conic shape at a distance of 1 mm. Other forms of the attracting potential could be used in place of these.

Each repelling pair contributes a potential value that is negligible or zero when the pair is far apart and grows large as the pair approach contact. This criterion is based on the separation distance of the pair. An alternative is to use penetration distance, in which case the potential value is zero when the links of the pair do not intersect and grows large as the links penetrate. Penetration distance is defined as the smallest translation possible to separate the links. If a clearance distance has been specified, the separation (penetration) distance is decreased (increased) by that amount before using the value to compute the contribution to the potential.

Suppose that the separation distance of pair of mutually repelling parts is d. Then, one form of the repelling potential is $$P_R(d) = \begin{cases} \infty & \text{if } d \le 0, \\ 1/(\alpha d), & \text{otherwise.} \end{cases}$$

where $\alpha$ is the same scaling factor as in the attracting potential. When the parts are in collision, d=0, so the potential is infinite. An alternative form of the repelling potential sets a minimum clearance distance $d_{min}$ for safety and a maximum distance $d_{max}$ beyond which repulsion is ignored:

$$P_R(d) = \begin{cases} \infty, & \text{if } d \le d_{\min}; \\ 0, & \text{if } d \ge d_{\max}; \\ \frac{1}{\alpha}\left(\frac{1}{d - d_{\min}} - \frac{1}{d_{\max} - d_{\min}} + \frac{(d - d_{\min})}{(d_{\max} - d_{\min})^2} - \frac{1}{(d_{\max} - d_{\min})}\right) & \text{otherwise.} \end{cases}$$

The third and fourth terms in the final expression in this equation provide continuity of the derivative at $d=d_{max}$, and are not strictly necessary.

Joint limits contribute potential values that are negligible or zero when the device degrees of freedom are such that no joint is near its limit of motion but that grow large as such a limit is approached. Suppose, as is often the case, that a joint has limits as $\theta_{min} \le \theta \le \theta_{max}$. This implies two joint limit distances: $\delta_1 = \theta - \theta_{min}$ and $\delta_2 = \theta_{max} - \theta$. Then each of these contributes a component $$P_L(\delta_i) = \begin{cases} \infty & \text{if } \delta_i < 0, \\ 1/(\alpha_i \delta_i), & \text{otherwise,} \end{cases}$$

to the total potential function, where $\alpha_1$ is a scaling factor. If the device degrees of freedom are measured in meters and radian, then $\alpha_1 = 1000$ has been found to work well. Clearly, this formula can be adapted similarly to the one above for repelling pairs using $\delta_{min}$ and in place of $d_{min}$ and $\delta_{max}$. In a more general case, limits may depend on a combination of joints. Then, one may consider a multi-dimensional "joint space" having the joint values as coordinate axes. The current joint values are a point in this space and the joint limits define a permissible volume within this space. Then, the distance $\delta$ to be used in the potential function is the distance from the current joint values to the closest point on the boundary of the permissible volume. When the joint space includes both translational and rotational joints, care must be taken to properly scale the coordinate axes. Roughly, the unit of distance should be commensurate with the scale of the links while the unit of angle is radian.

Process Steps

The following steps are carried out on a programmed computer. As noted in the following paragraphs, several of the steps can be accomplished using commercially available software, while others require new functionality to be added to such software.

I. Steps for Setting Up an Optimization:

1. Import Device Models

At the user's direction, a geometric description for each device (robot, locator, car part, etc.) is retrieved from a library of devices and drawn in the work cell. For example, plan views of assembly 14, locating fixtures 20 and clamping tools 22 as shown in FIG. 5 would be generated as required on the computer screen. The respective tools and workpieces are portrayed to shape and scale on a grid as shown in the figure. They are given an initial location and configuration as shown and that data is stored in the database of the computer. Apart from the shape and size of each device, the description employed in the computer analysis also includes kinematic information, such as the location and type of each joint in a robot. This information includes the limits of motion of each joint. Techniques for mathematically modeling such devices can be found in graduate-level textbooks on robotics. A common approach is the "A-matrix" method, based on 4×4 homogeneous transformation matrices, as described in R. P. Paul, *Robot Manipulators: Mathematics. Programming, and Control*, MIT Press, Cambridge, Mass., 1981, or J. M. Selig, *Introductory Robotics*, Prentice Hall, New York, 1992.

Computer models of this type are available within robot simulation packages, such as Deneb/IGRIP or Technomatics/ROBCAD.

2. Define Device Attachments

Each device is either attached to the floor (default) or to some part of another device. For example, the user may direct that a weld gun (e.g., 46) should be attached to the mounting face of a robot (e.g., 44). The specification of the attachment includes the translation and rotation of the base link of the device relative to the floor or part to which it is attached.

The attachment of a device is a standard operation of robot simulation packages. What is unique to the subject process is that these attachments may be selected as optimization variables, hence the location of a robot 44 on the floor or the location of a weld gun 46 on the robot will be adjusted automatically in the optimization step.

3. Define Program Sequence Steps

A sequence of operations is established. Each step in this sequence is a list of devices that move during the step. For each such device, a set of numeric joint values is given, indicating the configuration of the device at the end of the motion. When a device is first designated to move in a step, the joint values are inherited from the previous step. However, these may be adjusted (next step). Thus, referring to FIG. 5, each device included in each locating fixture 20 and each clamping tool 22 (P1–P8) would be designated to move from the arbitrary, but presumably reasonably well chosen, initial position to a position consistent with the desired layout of the manufacturing cell.

Ideally, the graphical interface should provide a way to step through the sequence and view the new configuration at each time, like a sequence of snapshots. Commercial simulation packages provide animation of such moves.

4. Move Device Degrees of Freedoms (Joints) to Initial Values at Each Step

The user may manipulate the joint values through a graphical interface by selecting a sequence step and a device and then moving the joints individually. These initial joint values can later be selected for optimization to find the configuration of the device that will reach its indicated target as defined in the next step. The initial joint values would be specified, e.g., for each manufacturing tool shown in FIG. 5.

5. Define Attracting Pairs

Any object in the work cell (a link of a robot, a fixture, a car part, etc.) may carry coordinate frames that move with the object wherever it travels. These typically mark critical points on the object, such as the clamp bite (42 in FIG. 4) of a clamping tool 22 or points on a car part (e.g., points 16 on, tail gate assembly 14) where it is to be supported and located. In addition to its position on the object, each coordinate frame has an orientation. For example, at a weld point, one of the coordinate axes will indicate the direction normal to the surface of the part.

An attracting pair expresses the intent that two such coordinate frames should coincide at the completion of a particular program step. Attracting pairs are defined by displaying the work cell at a particular program step and then selecting the pair of coordinate frames that should coincide. (Selection can be done graphically using a mouse or by indicating the names of the coordinate frames via a text interface.) Each attracting pair also has a type, which indicates whether it is desired that only the positions of the frames should coincide or that the orientation of the frames should also coincide. Furthermore, the specification of orientation can require full alignment of the frames or require only the alignment of one direction. For example, one might require that a weld tip touch a weld point along the normal direction to metal while allowing rotation about that direction. In the subject process, the attracting pair is indicated graphically by drawing a line (see attracting pair lines 50 in FIG. 5) between the two frames.

Attracting pairs are a fundamental and new aspect of this invention. Current practice, such as Deneb/IGRIP, has coordinate frames attached to objects and allows the user to specify that a robot move to align its tool with a particular coordinate frame. Although superficially similar, this is a much more limited facility, because if the robot cannot reach the target, one only receives a warning. In contrast, in the optimization phase of this process, the robot's joints, the robot's location in the work cell, and the object carrying the target can all be moved as necessary to bring the attracting pair together. Moreover, the optimization can move many devices simultaneously to meet all their targets. (In the Select Variables to Optimize step below, the user specifies any or all of these to be automatically adjusted.)

6. Define Repelling Pairs

As devices are moved about, it is imperative that interference (collisions) between objects be avoided. To this end, the user builds a list of pairs of devices that should be checked for collisions. Six repelling pairs 52 are indicated between locating fixtures 20 in FIG. 5 and the following figures. During the optimization step of this process, these devices will act similarly as if they are electrostatically charged and mutually repelling. Therefore, whatever freedom of motion remains after the attracting pairs are drawn together is used to push repelling pairs as far apart as possible. This creates as much clearance as possible, providing clearance for safe operation of the work cell on the factory floor.

In the existing software packages, the user also provides a list of devices to be checked for collision. The software then provides a warning of any collisions that occur during simulation of the work cell's operation. The fundamental difference is that the subject process not only detects the collisions, but also rearranges the layout to avoid them.

7. Select Variables to Optimize

As has already been mentioned, there are two kinds of variables that can be selected for optimization: attachments and joints. If a device is attached to the floor, selecting that attachment allows the location of the device on the floor to be adjusted. Similarly, the location in which a weld gun is mounted onto a robot can be selected for optimization. (A mounting bracket may have to be built to implement the attachment.) The optimization of an attachment can be constrained to certain directions. For example, the user may allow a robot to slide around on the floor (X-Y motion) but not allow it to rise off the floor (Z motion). Rotation can be similarly constrained. The user can also limit the range of motion for each attachment direction.

Joint values can also be selected for optimization. The user specifies a list of program steps and the devices in each step whose joints are allowed to be adjusted. It is important to note that a single joint, say the elbow of a robot arm, may lead to several independent joint values to be optimized, these values being the position of the joint at various program steps.

Summary: The Potential Function

The net result of steps 1–7 is the definition of an optimization problem. A total potential function is formed as the sum of component potentials. Attractors contribute a component that grows with increasing distance between the pair of coordinate frames that define it. Repelling pairs contribute a component that tends to infinity as the pair approaches collision, but dies off rapidly to zero as the pair is separated. Joints also contribute a component that grows large as the joint approaches a limit of motion. An important aspect of this invention is the use of the combination of information to define an optimization problem.

The drawings show three different optimization problems formulated according to the foregoing process. In FIG. 5, the result of each of the seven steps is as follows.

(1) Import device models

The superimposed tail panel parts and eight identical programmable locating devices have been brought into the work cell. Also, a clamping device has been imported for each locator. Each of the programmable locators has three rotational joints, whose initial values default to zero and which have allowed ranges as follows:

$-170° \leq \theta_1 \leq 170°$, $-170° \leq \theta_2 \leq 170°$, $-170° \leq \theta_3 \leq 170°$.

(2) Define Device Attachments

The tail panel parts and the programmable locating devices are attached to ground, by default. The clamping devices have been attached one-by-one to the final link of the locating devices, in the location shown. The attachment values determine where the devices appear in the work cell. For example, programmable locator P1 [see FIG. 5 for 20(P1) through 20(P8)] has been placed at x=−1105, y=1707, θ=−90°, where x and y are the position coordinates of point 39 (FIG. 4) of the device and θ is the rotation of the base. Programmable locator P8 is at x=0, y=−147, θ=+90°. The attachment values for the remaining devices are similarly defined.

(3) Define Program Sequence Steps

At this initial design stage, there is only one sequence step. It lists all the devices and their initial joint values. In this case, only the programmable locators have movable joints, of which there are three per locator. (This is a two-dimensional example, so the elevation joint and the final pitch joint of the programmable locator are not modeled.) At this point in the process, the joint values are at their default values as stored in the device model files, which were read in Step 1.

(4) Move Joints to Initial Values

The joint values for P8 have remained at zero (arm extended straight ahead), but they have been adjusted to other initial values on the other devices. For example, the joint values for P1 are set to $\theta_1=-1.7°$, $\theta_2=-5.7$, $\theta_3=-14.9°$, as shown in FIG. 5.

(5) Define Attracting Pairs

In FIG. 5, an attracting pair 50 has been defined between the clamp bite point 42 on the end of each programmable locator and a locating point 16 on the tail panel assembly 14. The pairs are indicated by a line segment 50 between the points. These attracting pairs have all been established as type 1: point-to-point attractors.

(6) Define Repelling Pairs

Repelling pairs have been set between the base links of adjacent programmable locators; these are indicated by line segments 52 between the closest points of the pairs. (In a preferred embodiment, these lines would be given a distinctive color, such as red.) The repelling pairs 52 are (P1,P2), (P2,P3), (P3,P4), (P4,P5), (P5,P6), and (P6,P7). P8 is well separated from the others, so a repelling pair is unnecessary.

(7) Select Variables to Optimize

In this example, we select for optimization the position of each programmable locator (x, y) and its three joint values ($\theta_1$, $\theta_2$, $\theta_3$). Accordingly, there are five optimization variables for each of the eight programmable locators, for a total of 40 variables to be optimized. The joint values are limited to the ranges specified at step 1, whereas no limits are imposed on the (x, y) positions in this example.

In a preferred embodiment, all of the foregoing operations to define the optimization problem would be implemented in a "point-and-click" fashion, wherein the choice of operations would appear on pull-down menus and the various geometric objects upon which the operations are to be applied would be selected with the mouse or similar user interface device.

Figure 7:
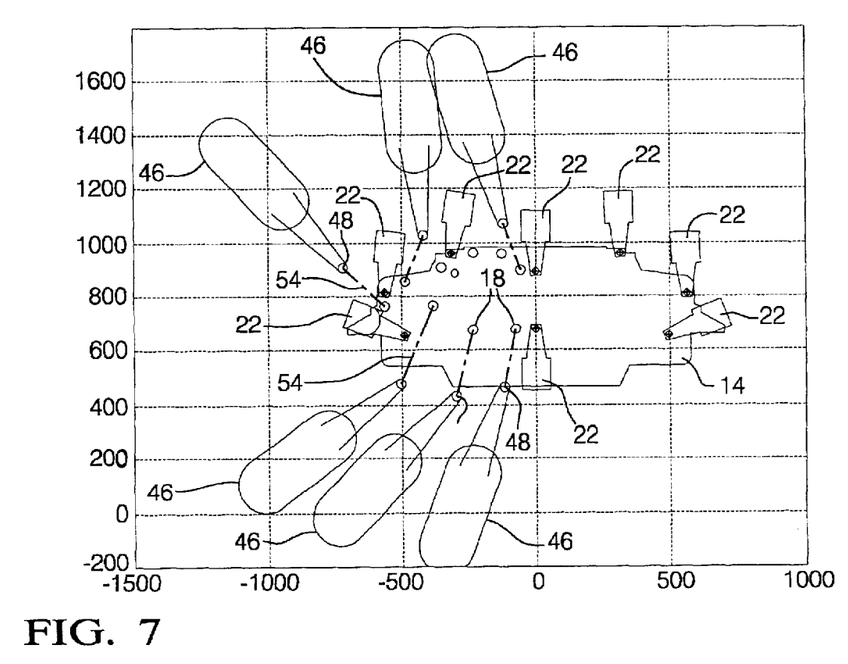
FIG. 7 is a computer-generated, plan view with coordinate grid of an initial arrangement of six welding gun positions overlaid with end-effector clamping tool portions only of the previously arranged locating devices.

For simplicity, the example just described contains only one program step, being the configuration in which a single tail panel assembly is held by programmable locating devices. In general, a work cell will execute a multi-step program. For example, FIG. 7 shows a continuation of the previous example to include several more program steps, these being the steps necessary to produce a sequence of spot welds to join the inner and outer panels. In the most general case, the program sequence may contain branch points where one of several alternatives may be chosen; for example, several different car models might be produced in the same cell. In this case, the program steps no longer are arranged in a single linear sequence, but rather are arranged in a tree structure as shown in FIG. 12. From the Home position, two alternatives are available: Maintenance (a position that allows access to grease fittings, perhaps) and Pounce (a position that facilitates quick motion to any of several production positions). From Pounce, there may be several branches, each leading to a sequence of steps that produces one of several different assemblies. This particular example is to be understood as just an illustration: trees of even greater complexity can be easily envisioned.

II. Optimization

1. Numerically Seek Values of Variables to Minimize the Potential Function

The potential function encodes in a numeric value the degree to which a layout satisfies the user's intent, which involves the simultaneous placement of multiple devices such that each one can reach a sequence of targets. A minimum of this function corresponds to a layout that most nearly meets the user's specification. As stated, a fundamental contribution of the invention is in the formulation of the layout problem as an optimization problem.

Figure 6:
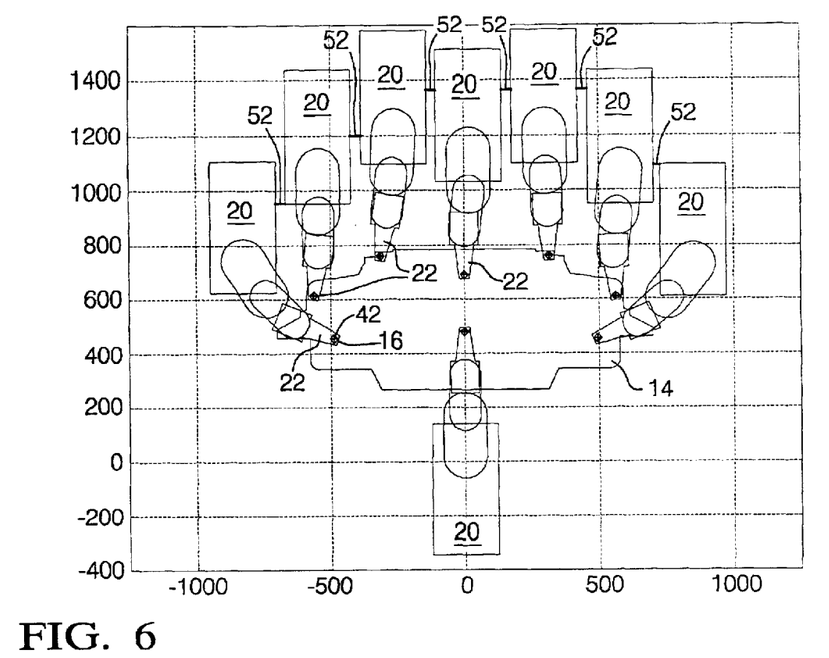
FIG. 6 is a computer-generated, zoom plan view with coordinate grid of an optimized arrangement of the locating devices shown in FIG. 5.

To perform the optimization, a suitable practice is to use the conjugate gradient method. This method chooses a sequence of linear directions to search in the multi-variate optimization space. (The dimension of this space is the number of variables selected for optimization in Step 7, above.) For each direction chosen by the conjugate gradient method, a search is conducted to find a local optimum along that line. Periodically, the optimization software redraws the graphical image of the work cell to allow the user to monitor the progress of the optimization. FIG. 6 illustrates the initial optimization of the location of the locating fixtures 20 around tailgate assembly 14. If the progress is judged to be unsatisfactory, the user may interrupt and make adjustments to the situation. See Section III, below.

The conjugate gradient method requires an evaluation of the gradient of the optimization function. Derivatives can also be used to advantage in the line search. As the total potential is the sum of multiple attracting, repelling and joint-limit potential components (see above), the gradient of the potential is the sum of the gradients of these components. The attracting and repelling components all have the functional form P(d), where d is the distance between two points. Let the two points in question be labeled A and B, having positions $p_A$ and $p_B$, respectively. Then, the vector from B to A is $r=p_A-p_B$ and the distance may be written as $d=\sqrt{r \cdot r}$. By the chain rule, the partial derivative of P with respect to any optimization variable x is $$\frac{\partial P}{\partial x} = \frac{\partial P}{\partial d}\frac{\partial d}{\partial r}\frac{\partial r}{\partial x} = \frac{\partial P}{\partial d}\frac{1}{d}r \cdot \left(\frac{\partial p_A}{\partial x} - \frac{\partial p_B}{\partial x}\right)$$

It is convenient to define a new function $G(d)=(\partial P/\partial d)/d$. In particular, for the case of a quadratic attractor, $P(d)=d^2$, one has $G(d)=2$, which avoids the division by zero at $d=0$ that would result in a naïve implementation.

To evaluate the above equation, one must know the positions of A and B. For attractors, points A and B are known in the coordinate systems of the parts which are to be aligned, so the positions of the points in world coordinates are easily found once the location of the associated parts have been computed. For repulsors, the points A and B may move on the surface of the repelling parts as their relative locations vary. Thus, the routine that determines the minimum distance between the parts must also return the closest point pair.

The remaining element necessary to evaluate the gradient is the computation of $\partial p_A/\partial x$ and $\partial p_B/\partial x$. These are the partial velocities of the points A and B with respect to the variable x and can accordingly be calculated using the standard approach for computing the velocity of a point in a kinematic tree. This is equivalent to finding the Jacobian for the endpoint of a robot. Orin and Shrader [1984] give a good summary of algorithms designed for this purpose. However, when considering the contribution of many components of the potential, it would not be efficient to calculate a new Jacobian for each point involved in an attracting or repelling pair. Fortunately, an efficient algorithm is easily derived by considering the principle of virtual work. Suppose that a force F is applied to point A and suppose that φ is the angle of rotation (in radians) of a rotational joint about which a torque T is exerted. Holding all other joints constant and rotating φ, in the absence of any energy storage, the instantaneous power Tφ̇ put into the joint must equal the power F·(dp$_A$/dt) extracted at point A, hence Tφ̇=F·($\partial p_A$/$\partial \phi$)φ̇ or simply T=F·($\partial p_A$/$\partial \phi$). For a translational joint, a similar relation holds except that on the left-hand side, the joint force appears instead of the joint torque. The upshot is that $\partial P/\partial x$ may be evaluated by considering that an external force F=G(d)r is applied to point A and an equal but opposite force is applied to point B. Then, the gradient is found by determining the force and torque at each joint to balance the applied external forces. Efficiency is obtained by first accumulating all of the forces from all of the potential components before performing the force balance in a single pass through the kinematic tree.

The computation of the gradient of the joint limit components is straightforward, as the joint variables appear directly in the formulas. Hence, further elaboration is not necessary.

2. Evaluate Layout

The first evaluation of the result of the optimization is to observe whether the attracting pairs have all been brought into coincidence. If not, the user must decide a course of action. He/she might only need to adjust the initial values (Step 4 above) and re-optimize, or in some cases a more substantial change might be needed, such as exchanging a robot for one with a larger reach.

If all the attracting pairs have come together, then the optimization has fully met the user's specification. A layout has been found in which every device can reach its target at the completion of every program step without interference between devices. However, it is possible that collisions might occur during the motion of a program step. To check this, the user would use the existing commercial software to simulate the entire motion, checking for collisions at finely spaced increments of time. The user may also evaluate cycle time or other measures of work cell performance. If any of these checks are unsatisfactory, the user may wish to change the sequence of program steps or make other changes that would imply a re-definition of the optimization problem.

III. Iteration

1. User May Add, Delete or Edit any of the Settings in Section I and Re-Run the Optimization If the evaluation indicates that the operation of the work cell is unsatisfactory in any way, the user may return to steps 1–7 of Section I and alter the definition of the problem. These alterations can be made in any order, save the obvious restriction that one must import a device before it can be moved or otherwise acted upon. Any existing entity, such as an attracting pair, can be modified (such as changing its type) or deleted, and new devices, sequence steps, attracting or repelling pairs can be added. Then, the optimization can be run again to see if the layout improves. It is also useful to have an "undo" function, for return to a previous state, in case that a newly optimized layout proves to be worse than the previous layout.

IV. Design by Stages

It is often beneficial to design in stages, such as to first concentrate on placing the car parts and the locating devices, leaving the robot placement and welding to a later stage. At each stage, the foregoing optimization approach can be used. When one advances to the next stage, one might begin by leaving the prior result fixed (that is, not choosing any optimization variables associated with the first stage) and optimize only the new devices or program steps. However, at any time, as necessary, the user can once again select the attachments or joint values from a prior stage to reconsider, for example, the placement of a locator in order to provide clearance for a welding operation.

FIG. 6 is a computer-generated plan view (with parts enlarged) of the optimized positions of the locating fixtures 20 and clamping tools 22 around tailgate assembly 14. Both the location of the locating fixtures 20 and the rotational position of the clamping tools 22 have been changed in the optimization process. The bite locations 42 of the clamping tools 22 are now superimposed on the locating points of the workpiece assembly 14. Since these frames are now coincident, the attracting pair lines shown at 50 in FIG. 5 have disappeared. Although the locating fixtures 20 are closer together, they are not touching and repelling pair lines 52 remain in FIG. 6.

This optimized location of the locating fixtures and clamping tools does not, of course, complete the layout of the manufacturing cell. Provision must be made to weld the tailgate stampings together.

FIG. 7 shows a computer screen representation of an initial layout of six positions of the welding gun 46 near the respective welding spots 18 on assembly 14. For ease of viewing, the locating fixtures are hidden except for their end-effectors, clamping tools 22. The six images of the weld gun 46 are overlays. The same gun will move sequentially to each of the weld points 18. Attracting pairs are indicated by lines 54 between a weld tip 48 position of the welding gun 46 and a nearby weld point 18.

Process steps 1–7 are now repeated with a focus on the locations of the locating fixtures 20, clamping tools 22, welding guns 46 and weld points 18. Each of the physical objects is one member of a repelling pair and weld tip 48 of the weld gun and each weld location is an attracting pair.

Figure 8:
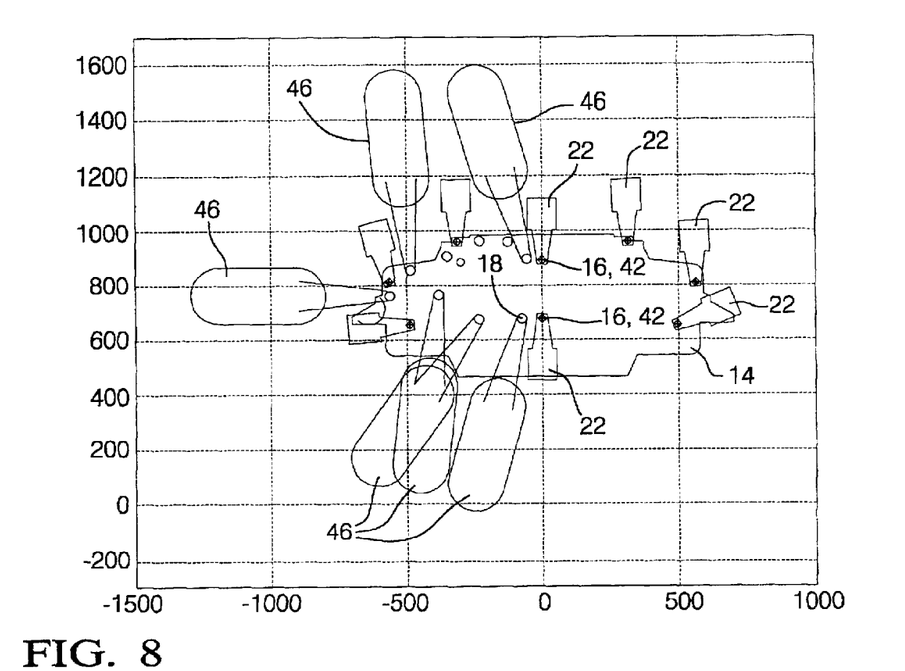
FIG. 8 is a computer-generated, plan view like FIG. 7 in which the positions of both the welding gun and the clamping units have been optimized.

At the completion of the second stage optimization, the manufacturing cell layout is as depicted in FIG. 8. The weld gun reaches all welding locations 18 without interfering with the locating tools 22. The lines of attracting pairs have disappeared and repelling pairs remain suitably separated. It is now necessary to undertake a third stage optimization to locate the welding robot so that it can carry the welding gun and make the necessary welds in the cell without interfering with the clamping tools and locating fixtures.

Figure 9:
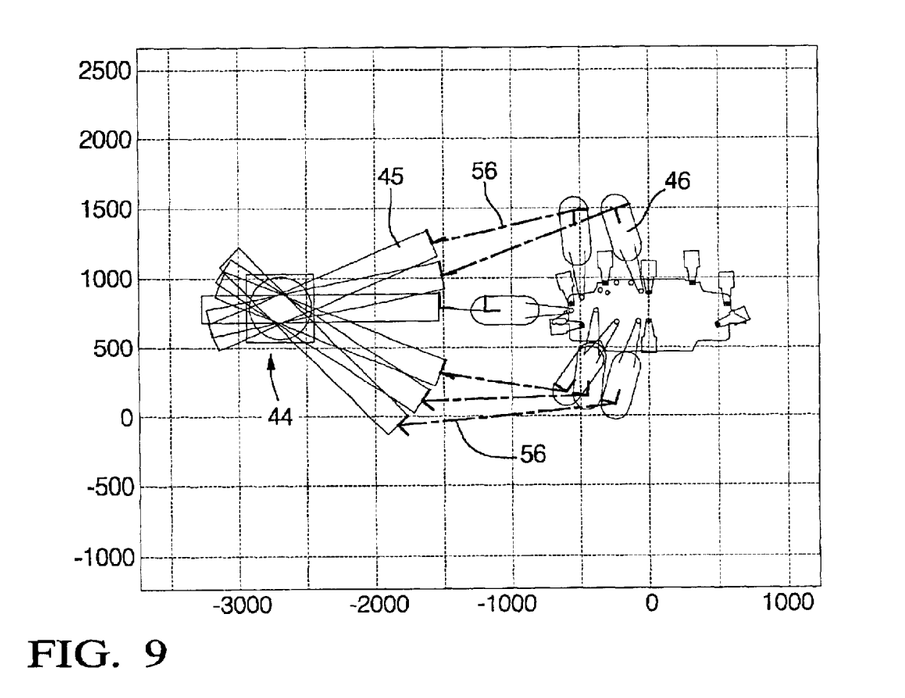
FIG. 9 is a computer-generated, plan view like FIG. 8 showing an initial location for the welding robot to accomplish all of the welding gun locations shown in FIG. 8.

FIG. 9 is a computer screen layout of an initial location of a welding robot 44 for carrying the welding gun 46 to successive welding locations 18. The process steps 1–7 are again followed to locate the robot 44 in an optimal position to make the required welds. The attracting pair as indicated by lines 56 is the robot arm 45 and welding gun 46. A repelling pair is the robot arm 45 and a nearby locating fixture (not shown in FIG. 9) and clamping tool 22.

Figure 10:
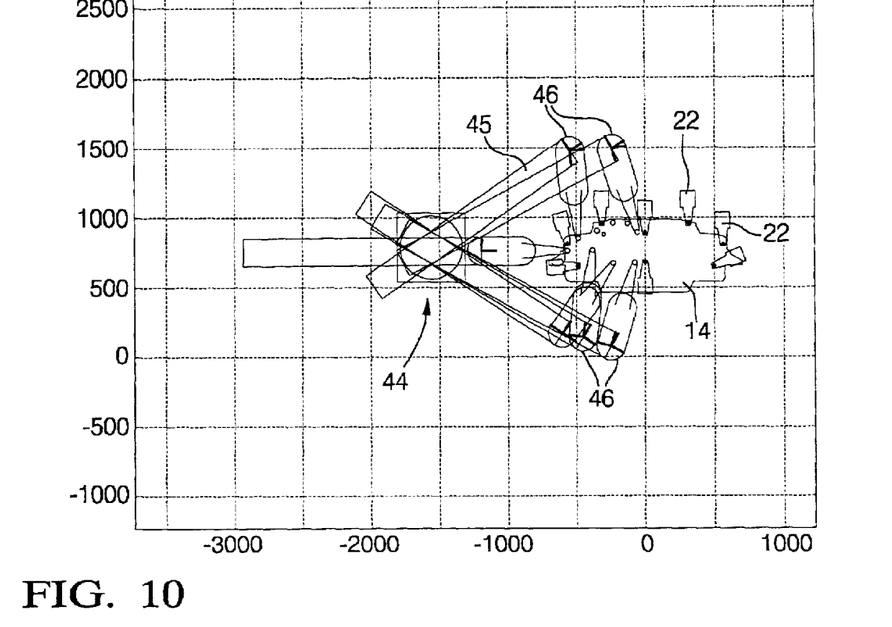
FIG. 10 is a computer-generated, plan view like FIG. 9 showing an optimized position of the weld robot placed where it can carry the weld gun to each of the six required weld points for the left side of the tail panel assembly.
Figure 11:
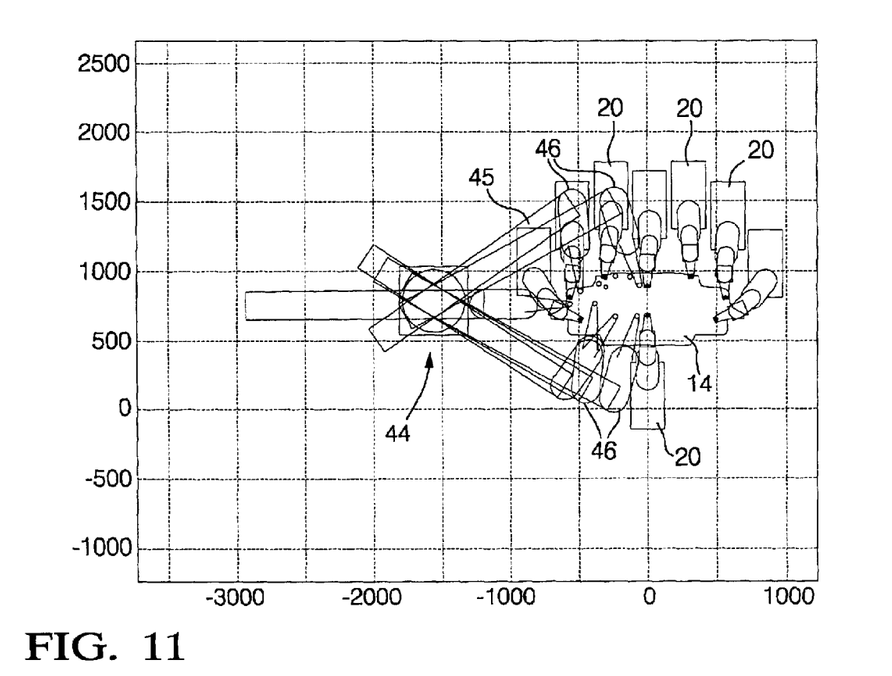
FIG. 11 is a view like FIG. 10 showing the full locating devices in combination with all other elements of the manufacturing cell.

FIG. 10 shows the optimized position of the robot, closely spaced from a clamping tool and able to carry the welding gun through its weld sequence. FIG. 11 shows the final manufacturing cell layout with all elements illustrated.

Thus, in this example the layout process was carried out in three stages to successively place the locating fixtures, the welding guns and, finally, the welding robot in the manufacturing cell. The result was a layout for welding a single sheet metal stamping assembly. In practice, the further stages of the process may have to be used to further refine the cell layout to handle similar but slightly different workpiece assemblies. While design by stages is a useful high-level strategy, it is the methodology of Sections I–III that forms the core of the invention.

The invention has been described in terms of specific examples. However, other embodiments could be developed by one skilled in the art for different cell layout situations and, therefore, the scope of the invention is to be considered limited only by the following claims.

What is claimed is:

1. A method of arranging at least one workpiece and one or more workpiece processing devices in a manufacturing cell using a programmable computer with a database, each said device either consisting of a rigid body or comprising two or more rigid bodies connected by kinematic joints, one of which bodies is declared to be the base link of said device, and each said workpiece and said rigid bodies having one or more virtual embedded coordinate systems, said method comprising entering a geometric description of said manufacturing cell in said database;

entering a geometric description for each said workpiece and workpiece processing device including kinematic and limit of motion data for each said joint of said devices into said database;

entering in said database an initial position and orientation of each workpiece and each base link, in which location each is either attached to ground in the cell or to another rigid body;

entering in said database a tree structure of program steps, the root node of said tree containing a value for each joint of each device in said manufacturing cell at some initial time, and each child node of a particular node in said tree representing an alternative motion in terms of a list of devices which will move should that alternative be chosen, and containing for each joint of each such moving device a value to be attained at the completion of the motion;

entering in said database identification of attracting pairs of coordinate systems, each member of the attracting pair being one of the embedded coordinate systems of said workpiece or said rigid bodies of said devices at a specified program step;

entering in said database identification of repelling pairs, each member of which is a workpiece or device in said manufacturing cell;

identifying in said database those workpieces and base links whose locations are to be moved from their initial positions and orientations and those joints whose values are to be adjusted, such movements and adjustments being optimized with respect to said attracting pairs and repelling pairs;

formulating a total potential function as a weighted sum over all program steps of the contributions from all attracting pairs at a step, all repelling pairs at a step, and the limits of those joints whose values are to be adjusted at the step; and subjecting the total potential function to a mathematical optimization analysis to find the prospective locations of workpieces and base links and the joint values to minimize the total potential function, thereby achieving an arrangement of each said workpiece and device in said cell in which said attracting pairs of coordinate systems are coincident, said repelling pairs are separated, and said joint values all lie within said limits of motion.

2. A method as recited in claim 1 comprising using computer graphics to display said manufacturing cell, workpieces, processing devices, attracting pairs and repelling pairs, and to indicate those workpieces, base links and joints which are subject to optimization.

3. A method as recited in claim 1 wherein said computer comprises a graphical user interface and said method comprises using said graphical user interface to add, delete or modify the entering of said geometric descriptions and positions and orientations of workpieces and devices in the said database, allowing said manufacturing cell arrangement to be created iteratively and allowing complex arrangements to be developed in several stages of increasing complexity.

4. A method as recited in claim 1 comprising integrating said method with computer simulation software so that any sequence of motion alternatives contained in said tree of program steps can be selected and the corresponding continuous motion through the sequence can be animated using computer graphics.

5. A method as recited in claim 1 comprising assigning said attracting pairs as consisting of attraction between the origin points of the coordinate systems of said pairs, leaving the relative orientation of the coordinate systems free.

6. A method as recited in claim 1 comprising assigning said attracting pairs as consisting of attraction between the origin points of the coordinate systems and attraction between a secondary pair of points of said systems, said secondary points being a specified non-zero distance along a specified direction of the said coordinate systems, thus causing the line segment from origin to secondary point of the respective bodies to align while leaving rotation about that line segment free.

7. A method as recited in claim 1 comprising assigning said attracting pairs as consisting of attraction between the origin points of the coordinate systems of said attracting pairs and attraction between two or more additional pairs of points of each of said systems, forming congruent geometric entities, so that bringing the corresponding points into coincidence fully constrains the relative orientation of said attracting pairs.

8. A method as recited in claim 1 wherein the function to be optimized is formed as a weighted sum of contributions from each attracting pair, repelling pair, and joint value whereby the attraction of an attracting pair is the sum of the contribution of each designated point pair of the coordinate systems of the attracting pairs and the contribution of a single point pair is a continuous, monotonically increasing function of the Euclidean distance between the points; the contribution of a repelling pair is zero if the bodies are separated by more than a specified upper distance, is infinity if the bodies interfere or are separated by less than a specified minimum distance, and is a continuous, monotonically decreasing function of the separation distance; and the contribution of a joint value is infinite if the value exceeds the upper or lower joint limit and monotonically decreases to zero as the joint value moves into the allowed joint limit range, such that a function value of zero implies that all attracting pairs are coincident, all repelling pairs are separated by at least the specified upper distance, and all joint values are within their respective joint limits.

9. A method as recited in claim 1 wherein when the location of a workpiece or base link is selected for optimization, the freedom to adjust the position and orientation can be restricted to be any subset among translation along and rotation about the three coordinate directions of a coordinate system selected from among those embedded in the body or in the body to which it is attached.

* * * * *